United States Patent
Määttänen et al.

(10) Patent No.: US 6,904,300 B1
(45) Date of Patent: Jun. 7, 2005

(54) MECHANICAL CONSTRUCTION AND AN ASSEMBLY METHOD FOR A MOBILE TELECOMMUNICATION DEVICE

(75) Inventors: Mikko Määttänen, Märynummi (FI); Heikki Harsu, Salo (FI); Juha Laaksonen, Piikkiö (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/503,272

(22) Filed: Feb. 14, 2000

(30) Foreign Application Priority Data

Feb. 17, 1999 (FI) ................................................ 990330

(51) Int. Cl.⁷ ................................................ H04M 1/00
(52) U.S. Cl. .................. 455/575.1; 455/90.3; 455/347; 455/348; 455/349
(58) Field of Search ................................ 455/558, 575, 455/90, 347, 348, 349, 351; 429/96, 97, 98, 99, 100; 341/22, 23; 200/511, 512; 361/715–727, 733, 683

(56) References Cited

U.S. PATENT DOCUMENTS

| | | | |
|---|---|---|---|
| 4,958,911 A | * | 9/1990 | Beiswenger et al. |
| 5,844,166 A | * | 12/1998 | Halttunen et al. |
| 5,867,772 A | * | 2/1999 | Jonsson et al. |
| 5,918,189 A | * | 6/1999 | Kivela |
| 6,274,825 B1 | * | 8/2001 | Aaltonen et al. |
| 6,321,441 B1 | * | 11/2001 | Davidson et al. |
| 6,381,477 B1 | * | 4/2002 | Johnson, Jr. et al. |
| 6,438,393 B1 | * | 8/2002 | Suuronen |
| 6,456,342 B1 | * | 9/2002 | Takenaka |
| 6,456,859 B1 | * | 9/2002 | Desblancs et al. |
| 6,463,263 B1 | * | 10/2002 | Feilner et al. |
| 2002/0057792 A1 | * | 5/2002 | Fuhrmann et al. |

* cited by examiner

Primary Examiner—David Hudspeth
Assistant Examiner—Huy D Nguyen
(74) Attorney, Agent, or Firm—Perman & Green, LLP (57) ABSTRACT

A mechanical construction of a mobile telecommunication device comprises a printed circuit board (401), a keypad, a display, a reader (500) for a detachable memory module and an outer cover consisting of at least two parts. Additionally it comprises a frame construction (200) into which said printed circuit board, keypad, display, reader for a detachable memory module and outer cover parts are mechanically coupled.

28 Claims, 6 Drawing Sheets

MECHANICAL CONSTRUCTION AND AN ASSEMBLY METHOD FOR A MOBILE TELECOMMUNICATION DEVICE

TECHNOLOGICAL FIELD

The present invention concerns the field of mechanical overall structures for small-sized, lightweight portable telecommunication devices like mobile telephones. The invention also concerns certain structural details that enhance the usability of a certain overall structure, as well as an assembly method taking advantage of a certain overall structure.

BACKGROUND OF THE INVENTION

Figure 1:
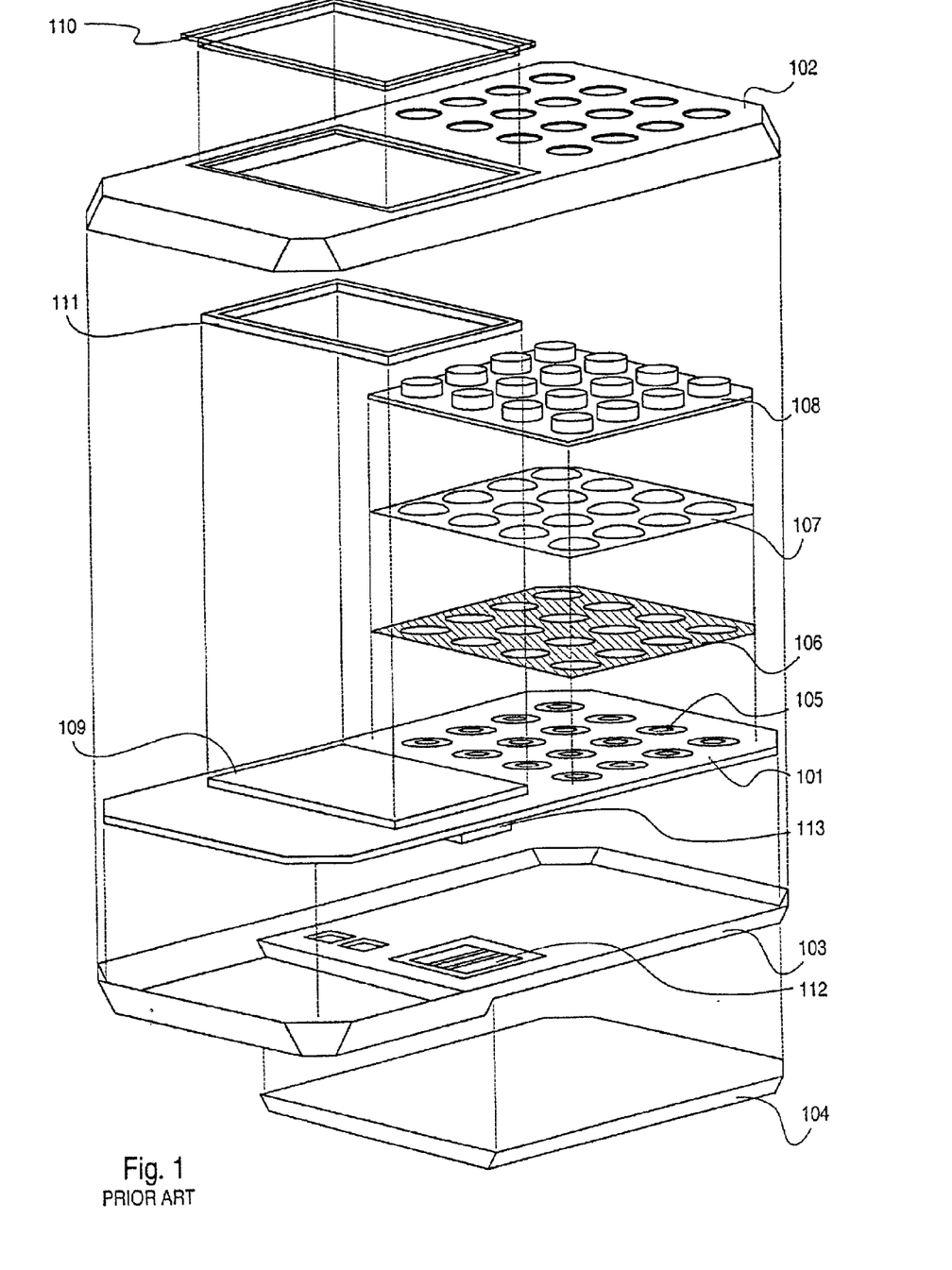
FIG. 1 illustrates a known mechanical structure of a mobile telephone.

FIG. 1 is a simplified exploded view of a typical prior art mobile telephone at the final assembly stage of its manufacturing. At the heart of the device there is a multilayer printed circuit board or PCB 101 onto which a large number of electronical components (not separately shown) have been soldered. The outer cover of the telephone consists of a front cover 102 and a back cover 103, which are attached to each other by screws or similar attachment means (not separately shown). The PCB may have been previously attached to one of the covers, or the same screws and/or separate alignment pins may serve to fix its position between the covers.

A battery pack 104 is snapped onto the outer side of the back cover where a latch (not separately shown) holds it in position. Onto the lower face of the PCB there has been soldered an appropriate connector (not separately shown) to produce an electrical connection between an attached battery pack and the electronic parts of the mobile telephone through holes in the back cover.

The keypad structure comprises a number of connection points 105 on the PCB surface, an insulating/adhesive film 106 where a punched hole corresponds to each connection point, a metallic domesheet 107 with a dome aligned with each connection point and an elastic keymat 108 where a key bulb corresponds to each key. The adhesive film 106 is two-sided so that it fastens the domesheet 107 onto the surface of the PCB, and the elastic keymat 108 is squeezed between the front cover 102 and the PCB 101 so that the key bulbs become visible on the front side of the telephone through a set of matching holes in the front cover.

The display section of the telephone consists of a LCD (Liquid Crystal Display) unit 109 soldered onto the PCB, a corresponding hole in the front cover 102 and a transparent window 110 which is glued to the front cover. An elastic gasket 111 is squeezed between the outer cover and the LCD unit to absorb mechanical shocks and twisting forces which could easily break the LCD unit which consists mostly of glass.

At the back of the battery compartment there is a SIM holder 112 into which a SIM or Subscriber Identity Module (not separately shown) is to be attached before snapping on the battery pack. A SIM reader 113 has been soldered onto the lower face of the PCB so that the electric connection surfaces of an appropriately input SIM will engage with the corresponding connection springs of the SIM reader.

The prior art construction of FIG. 1 has some drawbacks relating to its mechanical properties as well as to its characteristic requirements to the manufacturing process. The number of mechanically separate units that must be brought together in the final assembly stage is relatively large, which is not advantageous in terms of production logistics and automation. The provision of EMC (ElectroMagnetic Compatibility) shielding for selected components or component groups on the surfaces of the PCB requires separate metallic or metallized covers that should be removably attachable to the PCB. For the gasket of the LCD unit to effectively absorb mechanical shocks and twisting forces its thickness must be at least one millimeter, which makes the display assembly unnecessarily thick for the ultimately miniaturized portable telecommunication devices of today. The SIM reader reserves a relatively large area from the lower surface of the PCB, which adds to the congestion of components on the PCB. Additionally the bending and twisting strength of the mechanical structure is inherently not very high, which in turn dictates that the front and back covers must be made thick to appropriately resist bending and twisting forces.

In an alternative prior art construction some of the above-presented problems have been solved by replacing the simple concave shell-like front and back covers by more complicated shell structures where a number of ridges on their inner surfaces divide the inside of the mobile telephone into compartments. An elastic conductive polymer strip on the protruding edges of the ridges and a matching arrangement of metallized strips on the surface of the PCB provide an electric connection between the PCB and the covers, and a metallized layer on the inside of the covers together with said electrical contact constitutes a set of "EMC vaults" where certain groups of components lie enclosed within a conductive shielding. The ridges also serve as mechanical stiffeners, because they greatly increase the cross-sectional dimensions of the covers. However, they also make the manufacturing and surface treatment processes of the covers much more complicated and seriously limit the possibilities of the manufacturer to use the same covers for different models in a model series where the PCB layout should vary from one model to another. This approach also leaves a significant number of the above-mentioned problems unsolved.

SUMMARY OF THE INVENTION

It is an object of the present invention to provide a mechanical overall structure for small-sized, lightweight portable telecommunication devices that would help to avoid the above-mentioned problems of the prior art constructions. It is an additional object of the invention to provide structural details for the display, keypad and SIM reader sections of the overall structure that will enhance the usability of the overall structure.

The objects of the invention are achieved by building the portable telecommunication device around an inner frame construction. The additional objects relating to the structural details are achieved by using modular display and keypad arrangements that enable separate assembly, and a SIM reader which has contact springs for making electrical connections and a hollow space at its attachment surface to allow for components to be sandwiched between it and the PCB.

The mechanical construction according to the invention comprises a printed circuit board, a keypad, a display, a reader for a detachable memory module and an outer cover consisting of at least two parts. It is characterised in that it additionally comprises a frame construction into which said printed circuit board, keypad, display, reader for a detachable memory module and outer cover parts are mechanically coupled.

The invention also applies to an assembly method which comprises the characteristic steps of providing a frame construction,
converting said frame construction into a frame subassembly by attaching into it a volume switch, a volume key, a battery connector, an external connections connector, a vibrating alarm device and a set of springs and latches for controlling the movement of parts that are to be movable in an assembled mobile telecommunication device,
providing a printed circuit board with a significant part of the electronically functional components of the mobile telecommunication device attached thereto,
providing a previously assembled display module comprising a window, a display panel and a bottom plate,
providing a reader for detachable memory means
providing a set of outer cover parts, providing a previously assembled keypad module and
assembling the mobile telecommunication device by inserting said reader for detachable memory means into said frame subassembly, attaching said printed circuit board to the frame subassembly, attaching said display module and said keypad module on top of said printed circuit board and attaching said outer cover parts to the aggregate comprising said frame subassembly, reader for detachable memory means, display module and keypad module.

A frame construction of a portable telecommunication device is an inner mechanical unit that provides for mechanical support of basically all parts of the device and simultaneously serves as a basis for subassembly before the final assembly stage. Its cross-sectional dimensions are easily made very large compared to the cross-section of the whole telecommunication device, which translates into excellent resistance against bending and twisting forces. Advantageously the frame construction comprises ridges that support the assembled components on one hand and provide for compartmentalization on the surface of printed circuit boards pressed against the frame construction on the other for EMC shielding purposes. For the latter the surface of the frame construction may be partly or completely metallized, and selected portions of it may comprise elastic conductive polymer portions for making electrical contacts on large areas despite of mechanical tolerances. Parts of the frame construction may remain visible on the outside of even a completely assembled telecommunication device.

In a mobile telephone some components that are advantageously attached to the frame construction at some previous stage(s) before final assembly are the connectors for battery and external connections, the volume key and volume switch, the vibrating alarm device, and springs and latches for controlling the movement of parts that are to be movable in an assembled mobile telephone.

As a part of the frame construction or as a separate pre-assembled unit the invention provides for a keypad where all mechanical parts are advantageously attached together into a modular unit at some previous stage(s) before final assembly, and the only parts that remain outside said modular unit are the connection points on the surface of a PCB. In one advantageous embodiment such a modular unit consists of a cover portion with holes, a set of key hats to fill in the holes and to form the visible surfaces of the keys, an elastic keymat for providing for the movements of the keys, and a partly insulated dome sheet for providing for the coupling functions of the keys.

Similarly as a part of the frame construction or as a separate pre-assembled unit the invention provides for a display unit where a display window constitutes a mechanical subframe that supports all other display components.

Additionally the invention provides for a SIM reader which has two sets of connection springs on its opposite sides. One set is for making electrical connections to a PCB and the other is for making electrical connections to a SIM once attached. The frame construction has suitable structural details for keeping the SIM reader in place in the directions that are parallel to the surface of the PCB, and for squeezing it against the surface of the PCB at a corresponding assembly stage. In such an assembled arrangement the SIM reader will also provide mechanical support to the PCB. It is advantageous to make the SIM reader hollow or concave on the side which is to be pressed against the PCB so that other components may be sandwiched between the SIM reader and the surface of the PCB.

BRIEF DESCRIPTION OF DRAWINGS

The novel features which are considered as characteristic of the invention are set forth in particular in the appended claims. The invention itself, however, both as to its construction and its method of operation, together with additional objects and advantages thereof will be best understood from the following description of specific embodiments when read in connection with the accompanying drawings.

DETAILED DESCRIPTION OF THE INVENTION

Figure 2A:
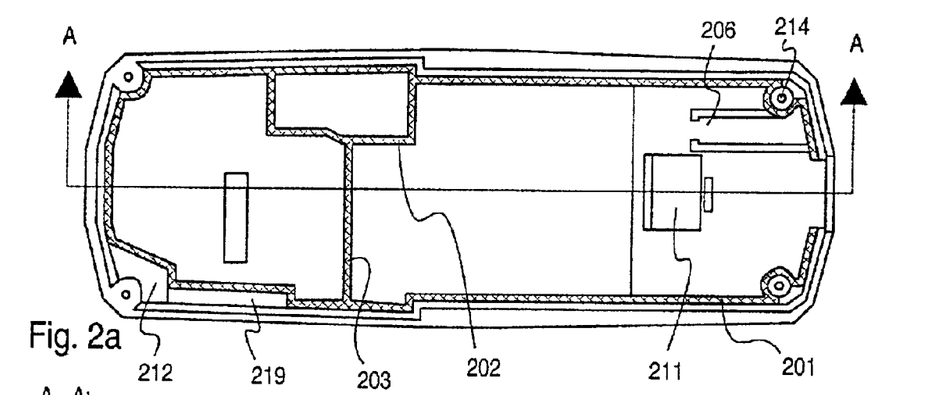
FIGS. 2a–2d illustrate a frame construction according to an advantageous embodiment of the invention.
Figure 2B:
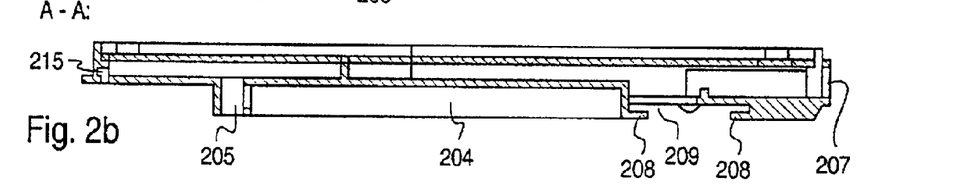
Figures 2C, 2D:
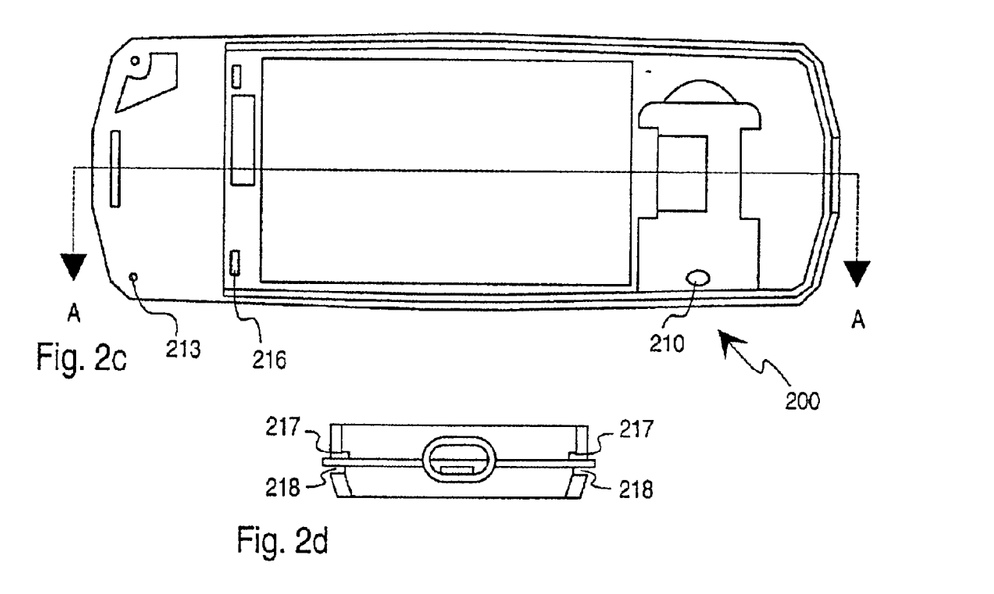

FIGS. 2a to 2d illustrate a frame construction 200 according to an advantageous embodiment of the invention seen from above (FIG. 2a), in a cross-section (FIG. 2b), from below (FIG. 2c) and from one end (FIG. 2d) which in FIGS. 2a–2c is the right-hand end. Here and at all subsequent occasions all terms that indicate directionality like "above", "below" etc. are used for illustrative purposes only and they do not restrict the applicability of the invention in any particular direction. In FIGS. 2a and 2b a cross-hatch indicates elastic conductive material and in FIG. 2b a simple hatch is used to illustrate cut-through sections. The frame construction 200 is particularly meant to be used as the frame construction of a mobile telephone with some telescopic features, i.e. parts (other than the frame construction) that are essentially linearly movable with respect to each other between a stowed position and an extended position.

The frame construction 200 is most advantageously made of a plastic material and coated with a conductive coating in e.g. a vapour deposition process. On its upper side it comprises a pattern of interconnecting ridges consisting of a circumferential ridge 201 that encloses a significant part of the whole upper side and one or more intermediate ridges 202 and 203 that divide the area enclosed by the circumferential ridge into two or more sections. A strip of elastic conductive material covers the protruding edge of the ridges. Said protruding edges are coplanar thoroughout the upper side of the frame construction, thus offering a planar bed for a PCB on the surface of which at least the elongated strips corresponding to the pattern of ridges have been left free of components. It is indeed the meaning of such a structure of ridges that a PCB may be squeezed against it, whereby the elastic conductive material provides an electric connection between the printed circuit board and the conductive coating of the frame construction whereby a number of closed EMC compartments are formed. Simultaneously the elastic conductive material acts as a gasket that evens out the sqeezing forces.

A battery compartment 204 constitutes the main part of the lower side of the frame construction. A battery connector shaft 205 with an opening into the battery compartment is provided as a passage between the battery compartment and the upper side of the frame construction so that a battery connector can be inserted therein to provide the required electrical connections between a battery pack (not shown) inserted into the battery compartment and a PCB (not shown) resting on the upper side of the frame construction. An advantageous battery connector is a tightly fitting one with a set of connecting springs for connecting to a corresponding set of connecting pads in both the battery pack and the PCB. The tight fitting (and/or interconnecting mechanical locking means in the connector and the frame construction) serves to hold the battery connector in place in the battery connector shaft during assembly, and the elasticity of the connection springs ultimately squeezes the battery connector into an immobile state inside the shaft.

At the right end of the frame construction there is a place and integrated holder 206 for a vibrating alarm device, an opening 207 for a charging/data connector and an integrated SIM holder (for the well-known thumbnail sized SIM version) consisting of a pair of tongues 208, a planar slot 209 beneath them and a wart 210 partially closing the opening of the slot so that it is only possible to insert or remove a SIM by bending it slightly. A hole 211 through the frame construction is also provided for a SIM reader (not shown) to be able to read, from the side of the PCB, a SIM inserted into the integrated SIM holder. At the left end of the frame construction there is a hole 212 through it for antenna conductor(s) to pass through.

For attaching the other parts of a mobile telephone to the frame construction 200 it comprises a number of features. Through holes 213 are provided for screws, rivets, alignment pins or similar attachment means passing through the frame construction, and blind holes 214 are provided for attachment means that are to be attached to the frame construction proper. Snap-on slots 215 and 216 are also provided for attaching structural parts that are flexible enough to allow snap-on attaching. Typically a part of the outer cover of the mobile telephone may comprise a set of matching hook-ended snap-on tongues that fit into the snap-on slots. In the exemplary embodiment we have assumed that the antenna compartment at the left end of the frame construction will be covered by such a cover part.

For such other parts of the mobile telephone that must be essentially linearity 10 movable with respect to the main body of the mobile telephone, there are pairs of sliding grooves 217 and 218. In this exemplary embodiment a first pair of sliding grooves 217 is provided for an upper slidable cover and a lower pair of sliding grooves 218 is provided for a lower slidable cover. We may assume that the upper slidable cover will cover the keypad of the mobile telephone in its stowed position and will comprise a microphone which in an operating position should be extended closer to the mouth of the user. Similarly we may assume that the lower slidable cover will be a shield to the battery compartment and the SIM holder and is to be removed only in association with inserting, inspecting or removing a battery pack or a SIM.

Said grooves may well comprise additional structural details such as slots for latches and springs. For graphocal clarity such additional details are not shown. If we accept the definitions of the upper and lower slidable covers as given above, we may further assume that a spring-loaded mechanism will be provided for clicking the upper slidable cover into a stowed extreme position and into an extended extreme position, and a latching mechanism will be provided for locking the lower slidable cover into its closed position.

The frame construction of FIGS. 2a to 2d comprises also a volume switch compartment 219 and next to it a corresponding opening (not shown) for a volume key engaging with the volume switch to that a user of an assembled mobile telephone is able to operate the volume switch by depressing the volume key. The volume switch compartment is open on that side which will be against the PCB in an assembled construction so that if a volume switch comprises suitable connection springs, it may be inserted into its compartment so that the connection springs protrude to the level of the elastic conductive material on top of the ridges described previously. When the PCB is then squeezed into position, the connection springs of the volume switch will press against corresponding connection pads on the surface of the PCB. Naturally similar compartments may be designed into the frame construction for other switches that are to be operable from outside after final assembly.

Figure 3:
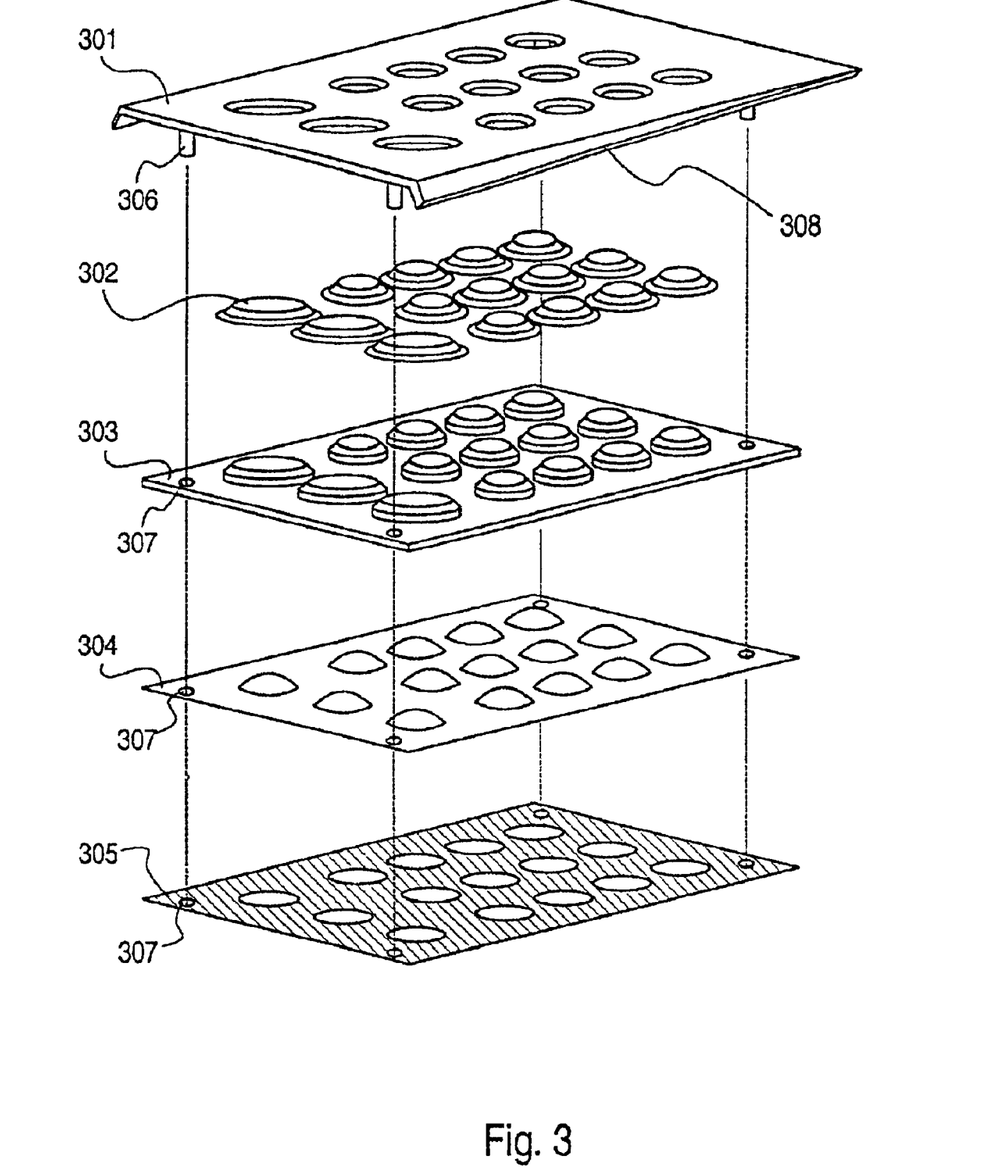
FIG. 3 illustrates a keypad construction according to an advantageous embodiment of the invention.

FIG. 3 is a simplified exploded view of a keypad construction which is advantageously used together with the frame construction of FIG. 2 and a PCB attached to it. The keypad construction comprises an essentially rigid front cover piece 301 with a multitude of holes for the keys. A separate key hat 302 fits into each hole from below and constitutes the visible surface of the key. Under the set of key hats there is an elastic keymat 303 where a bulb corresponds to each key: in an assembled keypad construction each key hat will cover the top of one bulb in the elastic keymat Additionally the keypad construction comprises a conductive dome sheet 304 with as many domes as there are keys, and an insulating adhesive film layer 305 with holes corresponding to the domes of the dome sheet. We will assume that on the surface of said PCB there are connection points so that in an assembled construction the depression of a key will cause the corresponding conductive dome to produce an electric contact in the respective connection point as is known from prior art keypads.

The difference between the keypad construction of FIG. 3 and the prior art keypad constructions is that the parts shown in FIG. 3 constitute a separately assemblable aggregate. The front, cover piece 301 comprises a number of pins 306 and the elastic keymat 303, the dome sheet 304 and possibly also the insulating adhesive film layer 305 comprise a matching set of holes 307. The parts of FIG. 3 may be assembled by bringing them together in the vertical direction of FIG. 3 so that the pins 306 go through the holes 307 and by upsetting the ends of the pins. If the insulating adhesive film is two-sided it may not be necessary to have holes in it, because it is possible to assemble the other parts as described above and to just attach the insulating adhesive film onto the lower surface of the dome sheet by means of its own adhesive capacity.

The invention does not limit the number of the pins and holes or their location. It is also possible to leave some of the pins unupset so that they may further be used as alingnment pins when the keypad construction is attached to the other parts of the mobile telephone. All keys in the keypad have been shown simply as single keys. However, it is possible to have in the keypad at least one key with multiple functions; for example a two-ended arrow key may actually have two domes under it so that pressing one end of the key will cause the first dome to buckle in and pressing the other end of the key will cause the second dome to buckle in.

The key hats are not an essential part of the keypad construction but they improve the tactile feel and wear resistance of the keys when compared to the elastic surface of the bulbs in the keymat. Additionally they give the designer of the mobile telephone a larger variety of appearance alternatives to choose from, because a larger number of distinctive coating and surface treatment alternatives are available for non-elastic surfaces. The key hats may be made for example by embossing from a thin metal sheet or from a hard plastic.

We will also briefly discuss some possibilities of providing a lighting to the keypad. Users appreciate a lighted keypad because it will be easier to use in conditions of limited ambient lighting. A very advantageous solution is to use the elastic keymat as a light conductor. To accomplish such an aim it is possible to manufacture the elastic keymat from a translucent material like silicone rubber which may be clear or coloured, and to provide light sources like surface-mounted light-emitting diodes at the edges of the elastic keymat to emit light into it. To allow the light to pass from the elastic keymat to the outside of the keypad several alternative solutions are available. According to one alternative the key hats are manufactured so that they are basically non-transparent but comprise transparent areas in the form of geometrical figures or letters, numbers and/or other characters. According to another alternative the key hats are left solid and non-transparent, but transparent areas, signs and/or characters are formed into the front cover piece next to the holes for the keys. The latter, is easily achieved by manufacturing the front cover piece from a generally transparent material like polycarbonate, painting its outer surface with a non-transparent paint and by laser etching or otherwise removing the paint from the points which should be transparent. Both of these alternative approaches may be used in a single keypad so that there is at least one key with transparent area(s), sign(s) and/or character(s) within the key and at least one key (which may even be the same key) with such area(s), sign(s) and/or character(s) next to it in the front cover piece.

The keypad construction of FIG. 3 is easily attached to the frame construction of FIG. 2 so that the specifically shaped side edges 308 of the front cover piece are fastened to the side ridges of the frame construction by glueing, ultrasonic welding or other fastening means known as such. Additionally or alternatively there may be screwholes (not shown) through the keypad construction so that it may be fastened by screws. A PCB must have been previously attached to the frame construction so that in a completed assembly it will lie between the frame construction and the keypad construction; the same screws may also go through corresponding holes in the PCB. If a sliding outer cover is going to partially cover the keypad, it is most advantageous to locate the screwholes so that even in its outmost position the sliding outer cover will not reveal the screw heads.

Figure 4:
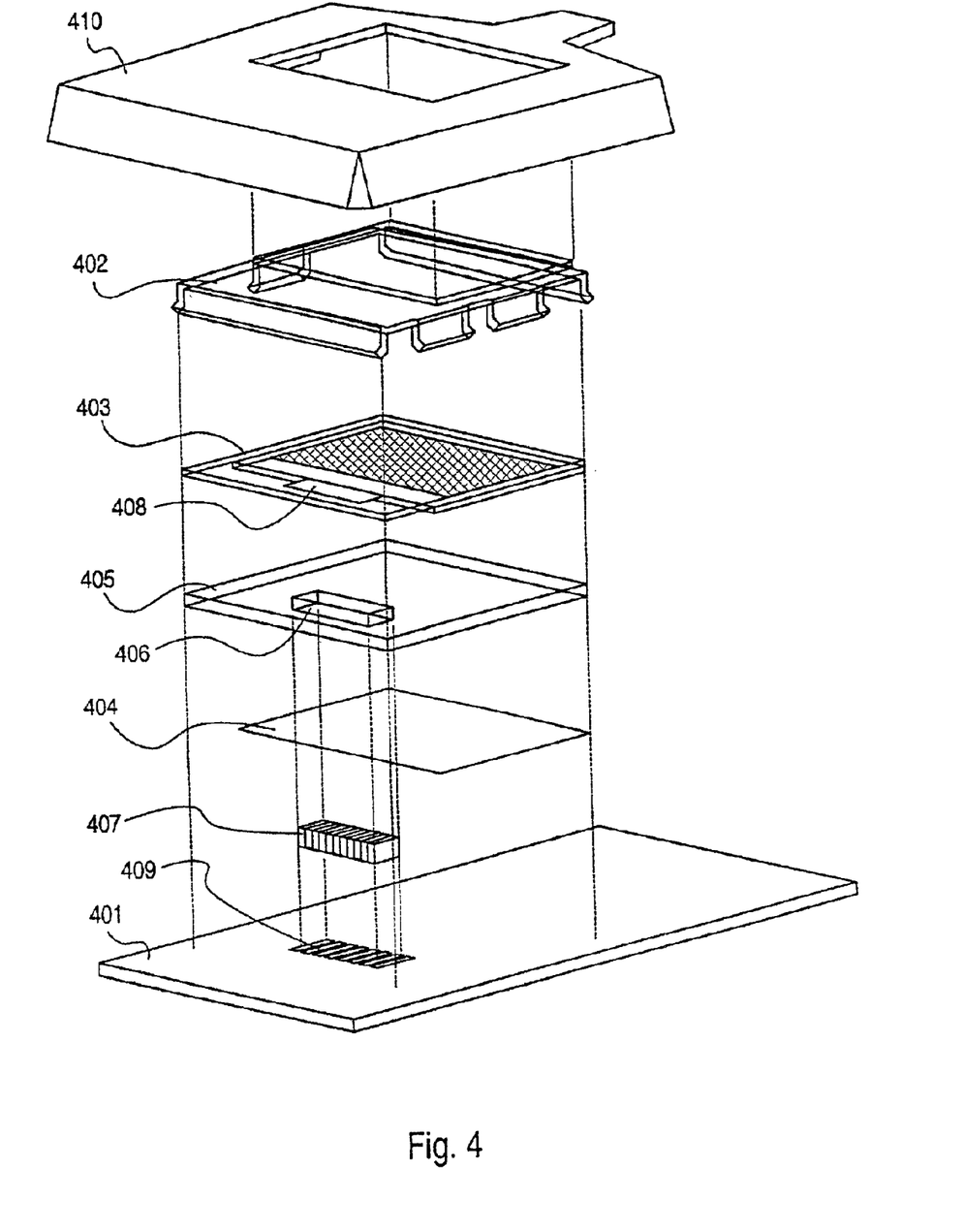
FIG. 4 illustrates a display construction according to an advantageous embodiment of the invention.

FIG. 4 is a simplified exploded view of an advantageous display construction which may be used together with the frame construction of FIG. 2 and an associated PCB 401. The basic structural part of the display construction is the transparent window 402 which resembles a shallow box in an upside down position. An LCD element 403 known as such fits into this box, and a bottom plate 405 closes the box so that the LCD element is sandwiched between the bottom plate and the flat part of the window. A reflector 404 is attached to the bottom surface of the bottom plate. Ultrasonic welding, glueing of some other fastening method known as such is advantageously used to permanently attach the edges of the bottom plate and the window together, whereby a compact structural unit is formed; we will designate this unit as the display module.

The bottom plate comprises an opening 406 into which an elastomeric conductor array 407 is squeezed. The thickness of the elastomeric conductor array in the direction which is vertical in FIG. 4 is somewhat larger than the thickness of the bottom plate. At the corresponding location in the LCD element there is an input connector plate 408, so squeezing the elastomeric conductor array 407 into the opening 406 will produce an electric connection arrangement in which the lower surface of the elastomeric conductor array protrudes slightly downwards from the lower surface of the bottom plate and provides a feeding contact into the LCD element.

On the upper surface of the PCB 401 there is an array of parallel contact strips 409. An arrangement of alignment pins, snap-on tongues and/or equivalent mechanical means is advantageously used to align the assembled display module into a specific location in relation with the PCB, whereby the array of parallel contact strips 409 comes into contact with the lower surface of the elastomeric conductor array 407. A display driving connection is thereafter complete from a display driver circuit (not shown) on the PCB to the array of parallel contact strips 409 and from there through the elastomeric conductor array 407 to the input connector plate 408 of the LCD element and further to the actual display pixels through the inner couplings of the LCD element.

The above-mentioned arrangement of alignment pins, snap-on tongues and/or equivalent mechanical means for aligning the display module in relation with the PCB may engage with corresponding structural details in the PCB. Alternatively we may take advantage of the fact that the PCB will in turn be attached to a frame construction so that the corresponding structural details are at least partly in the frame construction and not in the PCB.

FIG. 4 also shows how the display arrangement relates to the outer cover of the mobile telephone. A part of the outer cover 410 is shown where an opening corresponds to the part of the display arrangement which should be visible from the outside of the mobile telephone. A corresponding portion of the upper surface of the window 402 is elevated from the general level of the upper surface so that when the window 402 and the outer cover part 410 are brought together, the elevated window portion fills the opening and forms an essentially continuous outer surface together with the solid parts of the outer cover part. The edges of the outer cover part are advantageously attached to the edges of a frame construction like that in FIG. 2 so that the display module and the PCB become sandwiched between the frame construction and the outer cover part.

The illustrated form of the edges of the window 402 is examplary and it is easy for the person skilled in the art to understand that other forms are equally well applicable. An advantageous way of providing lighting for the display is to leave some openings in the edges of the window and/or the bottom plate so that a number of surface-mounted light-emitting diodes (not shown) on the surface of the PCB protrude into the display module and emit light into the planar transparent structures under the actual LCD display panel. A number of suitable lightguide arrangements for these planar structures are known in the art. In the arrangement of FIG. 4 where the reflector is on the lower surface of the bottom plate, the bottom plate itself may be used as a planar lightguide. In that case it must be made of essentially transparent material. It is also possible to provide a reflector between the LCD element and the bottom plate instead of at the bottom of the bottom plate and use the structures of the LCD element as the lightguide(s). The reflector does not need to be a separate mechanical entity but it can be formed by coating for example one of the planar surfaces of the bottom plate.

The mechanical roles of the window and the bottom plate may be interchanged to the extent where the window is essentially flat and the bottom plate is box-like, whereby the bottom plate serves as the basic structural part of the display construction. Also the alignment pins, snap-on tongues and/or equivalent mechanical means for aligning the display module in relation with the PCB may be a part of the bottom plate instead of or in addition to them being a part of the window.

Figure 5A:
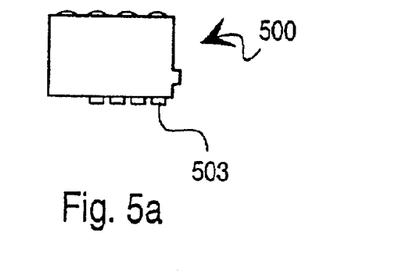
FIGS. 5a and 5b illustrate a SIM reader according to an advantageous embodiment of the invention.
Figure 5B:
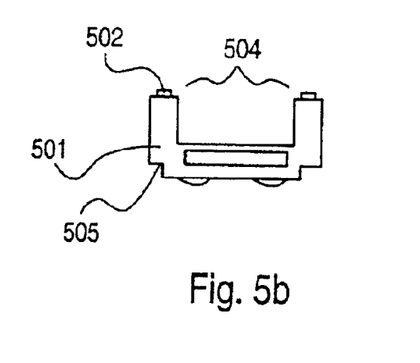

FIGS. 5a and 5b are side and end projections of an advantageous SIM reader 500 which may be used together with the frame construction of FIG. 2 and an associated PCB. From the end projection of FIG. 5b we see that the cross section of the body 501 of the SIM reader has the shape of a rectangular letter U. The upper side of the SIM reader is meant to be pressed against a PCB and the lower part against a SIM. At the end of the upward projecting arms of the U there is an arrangement of contact springs 502. On the surface of the PCB (not shown) there should be a corresponding arrangement of contact pads so that pressing the SIM reader agains the PCB will produce an electric contact between each pair of a contact spring and a contact pad. On the lower surface of the SIM reader there is similarly an arrangement of contact springs 503, but contrary to the PCB side contact springs 502 these must be arranged to correspond to the standardized organisation of contact pads on the surface of a SIM. The body of the SIM reader comprises a set of conductors (not shown) to connect the upper and lower contact springs together. The most obvious alternative is to have a one-to-one relationship between the contact springs so that from each upper contact spring there is a connection to exactly one lower contact spring and vice versa, but this is not a limitation to the applicability of the invention: for example power and ground connections are often duplicated to ensure error-free connections. Forming conductors within or on the surface of a dielectric body block is well known in the art so we will not describe the structure of the conductors in more detail.

The U-shaped cross section of the SIM reader allows for components to be placed onto the surface of the PCB even in the area which is designated as 504 in FIG. 5b. These components will then become sandwiched between the PCB and the body of the SIM reader preferably without touching the latter. This helps to relieve the congestion of components on the PCB. The body of the SIM reader comprises also some step-formed details 505 for aligning it with corresponding structural details in a frame construction of a mobile telephone.

Figure 6A:
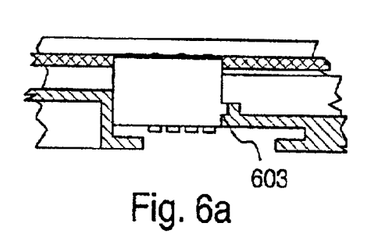
FIGS. 6a to 6c illustrate the location of a SIM reader according to FIGS. 5a and 5b within a frame construction according to FIG. 2
Figure 6B:
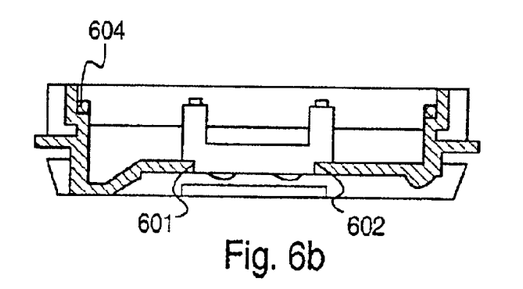
Figure 6C:
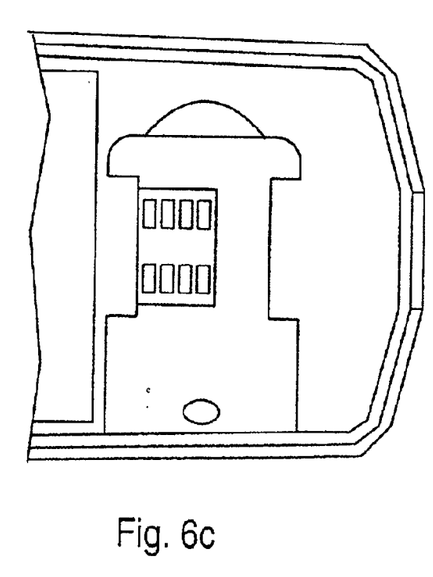

FIGS. 6a, 6b and 6c show a SIM reader in position within a frame construction according to FIG. 2. FIGS. 6a and 6b are partial cut-outs. At points 601, 602 and 603 the structural details mentioned above lock the SIM reader into position so that it covers the hole which was designated as 211 in FIG. 2. They also offer mechanical support so that a pressing force against the SIM reader from above will be conveyed to the frame construction. The idea is then to first attach a PCB to the combined structure of a frame construction and a SIM reader so that the PCB will be squeezed against the SIM reader at the middle and against the elastic conductive polymer strips 604 at the edges. After that a SIM will be inserted into the SIM holder, whereby the SIM presses against the lower contact springs of the SIM holder and an electric connection is produced between the PCB and the SIM through the SIM reader. The stiffness of the contact springs is most advantageously selected so that the upper contact springs are stiffer than the lower contact springs so that inserting a SIM will only press in the lower contact springs and not essentially change the location of the SIM reader within the frame construction.

Figure 7:
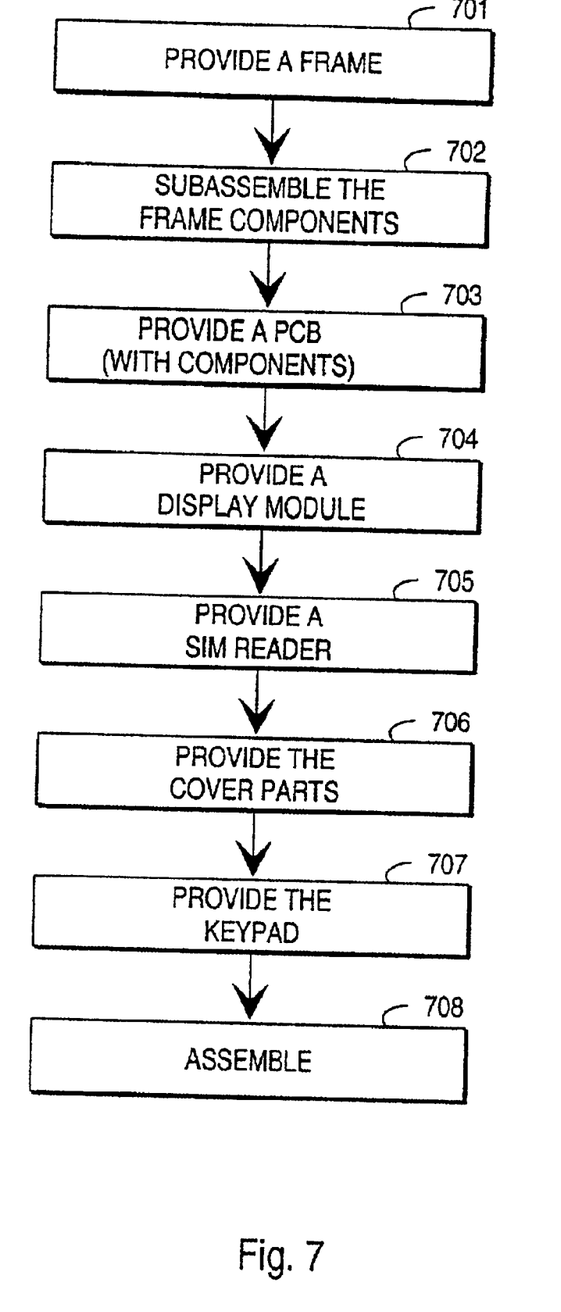
FIG. 7 illustrates an advantageous method according to the invention.

FIG. 7 illustrates an advantageous embodiment of the method according to the invention for assembling a mobile telecommunication device. At step 701 a frame construction is provided, and at step 702 it is converted into a frame subassembly by attaching into it a volume switch, a volume key, a battery connector, an external connections connector, a vibrating alarm device and a set of springs and latches for controlling the movement of parts that are to be movable in an assembled mobile telecommunication device. At step 703 there is provided a printed circuit board with a significant part of the electronically functional components of the mobile telecommunication device attached thereto. At steps 704, 705, 706 and 707 there are provided respectively a previously assembled display module comprising a window, a display panel and a bottom plate; a SIM reader; a set of outer cover parts and a previously assembled keypad module. All the subassemblies appearing in the foregoing steps may come from different sources to a final general assembly plant or process. Step 708 is the final assembly step where the mobile telecommunication device is completed by inserting said reader for detachable memory means into said frame subassembly, attaching said printed circuit board to the frame subassembly, attaching said display module and said keypad module on top of said printed circuit board and attaching said outer cover parts to the aggregate comprising the other parts.

The above presented examplary embodiments are not to be construed as limiting to the scope of the invention, as modifications and alterations are possible within the claims.

What is claimed is:

1. A mechanical construction of a mobile telecommunication device, comprising:
   a printed circuit board,
   a keypad,
   a display,
   a reader for a detachable memory module,
   an outer cover comprising at least two parts, and
   a frame construction which is a mechanical entity separate from said printed circuit board, keypad, display, reader for a detachable memory module and outer cover parts, and into which said printed circuit board, keypad, display, reader for a detachable memory module and outer cover parts are mechanically coupled, such that the at least two parts of the outer cover are mechanically attached to opposite sides of the frame construction.

2. A mechanical construction according to claim 1, wherein the display is a separately assembled stack of layers comprising a window, a liquid crystal display unit and a bottom plate.

3. A mechanical construction according to claim 2, wherein one of the outer cover parts of the mobile telecommunication device defines a display opening and has a certain thickness at the edge of said display opening, and said window comprises a portion elevated by said certain thickness for filling said opening so that in an assembled mechanical construction an outer surface of the aggregate formed by said outer cover part and said window is essentially even.

4. A mechanical construction according to claim 2, further comprising a reflector at one planar surface of the bottom plate for conveying light into the liquid crystal display unit.

5. A mechanical construction according to claim 2, wherein the bottom plate defines an opening and the display additionally comprises an elastomeric conductor arrangement for connecting electric signals through said opening into said liquid crystal display unit.

6. A mechanical construction according to claim 2, comprising, at the edges of said display, mechanical means for aligning the display in relation with the printed circuit board.

7. A mechanical construction according to claim 6, wherein said mechanical means additionally attach the display to the printed circuit board and/or to said frame construction.

8. A mechanical construction according to claim 1, wherein said frame construction defines a battery compartment for removably attaching a battery pack, and said frame construction comprises means for removably attaching one of said outer cover parts to cover said battery compartment.

9. A mechanical construction according to claim 8, wherein said frame construction
   is essentially flat comprising a first side and a second side whereby said battery compartment is on the first side and the printed circuit board is to be attached on the second side, and
   defines a battery connector shaft as a passage connecting said battery compartment to said second side.

10. A mechanical construction according to claim 9, additionally comprising a separate battery connector inserted into said battery connector shaft, and in said battery connector a first set of connection springs for providing an electrical connection to a battery pack and a second set of connection springs, electrically coupled to said first set of connection springs, for providing an electrical connection to the printed circuit board.

11. A mechanical construction according to claim 1, wherein said frame construction defines a switch compartment for housing a switch operable from the outside of the frame construction and separately attachable to the frame construction.

12. A mechanical construction according to claim 1, wherein said frame construction defiens a vibrational alarm device compartment for housing a vibrational alarm device separately attachable to the frame construction.

13. A mechanical construction according to claim 1, wherein said frame construction comprises an integrated holder, made of the same piece with the rest of the frame construction, for holding a removable attachable memory module.

14. A mechanical construction according to claim 13, wherein said frame construction is essentially flat defining a planar direction, and said integrated holder defines a planar slot in said planar direction and comprises a pair of tongues for limiting said planar slot in a direction perpendicular to said planar direction and a wart for reducing the free dimensions of said planar slot in said planar direction.

15. A mechanical construction according to claim 13, comprising, next to said integrated holder, a memory module reader with a first set of connection springs for connecting to the printed circuit board, a second set of connection springs for connecting to a detachable memory module and conductor means for electrically coupling said first and second sets of connection spring to each other.

16. A mechanical construction according to claim 15, wherein the form of said memory module reader defines a hollow space within the total area limited by said first set of connection springs.

17. A mechanical construction according to claim 1, wherein said frame construction comprises an essentially planar surface and a set of ridges protruding from it for attaching the printed circuit board onto said ridges parallel to said essentially planar surface but separated from it and so that said ridges divide the space between said essentially planar surface and a printed circuit board so attached into least two separate subspaces.

18. A mechanical construction according to claim 17, wherein said essentially planar surface and said ridges are electrically conductive for providing electromagnetic shielding to said subspaces.

19. A mechanical construction according to claim 18, wherein said ridges comprise at their protruding edge an elastic conductive gasket layer for sealing the printed circuit board against said ridges.

20. A mechanical construction according to claim 1, wherein the keypad is a separately assembled stack of layers comprising a front cover part defining a set of key openings, an elastic keymat with a protruding key bulb corresponding to each key opening in said front cover part, and a dome sheet with an elastically deformable conductive dome corresponding to each key bulb in said elastic keymat.

21. A mechanical construction according to claim 21, wherein said elastic keymat is translucent to light at a certain visible wavelength for providing lighting to the keypad using the elastic keymat as a light conductor.

22. A mechanical construction according to claim 21, wherein said front cover part is generally non-transparent to light at visible wavelengths but comprises an area which is transparent to light at said certain visible wavelength for allowing light to pass from said elastic keymat through said area to that side of the front cover part which is not against said elastic keymat.

23. A mechanical construction according to claim 22, wherein said area transparent to light at said certain visible wavelength is located next to a certain key opening and has the form of a human-readable character for indicating the function of a key corresponding to said certain key opening.

24. A mechanical construction according to claim 20, wherein the keypad additionally comprises, between said front cover part and said elastic keymat, at least one key hat covering the protruding part of a key bulb.

25. A mechanical construction according to claim 24, wherein
   said elastic keymat is translucent to light at a certain visible wavelength for providing lighting to the keypad using the elastic keymat as a light conductor,
   said key hat is generally non-transparent to light at visible wavelenghts but comprises an area which is transparent to light at said certain visible wavelength for allowing light to pass from said elastic keymat through said area to that side of the key hat which is not against said elastic keymat and
   said area transparent to light at said certain visible wavelength has the form of a human-readable character for indicating the function of a key corresponding to said key hat.

26. A mechanical construction according to claim 20, wherein the keypad additionally comprises an insulating adhesive film layer on that side of said dome sheet which is not against said elastic keymat.

27. A mechanical construction according to claim 20, wherein said front cover part comprises a set of pins with protruding ends and said elastic key mat and said dome sheet define a set of holes corresponding to said set of pins for assembling the keypad by bringing said front cover part, said elastic keymat and said dome sheet together so that said pins go through said holes.

28. A method for assembling a mobile telecommunication device, comprising the steps of provi­ding a frame construction, converting said frame construction into a frame subassembly by attaching into it a volume switch, a volume key, a battery connector, an external connections connector, a vibrating alarm device and a set of springs and latches for controlling the movement of parts that are to be movable in an assembled mobile telecommunication device, providing a printed circuit board which is a mechanical entity separate from said frame construction and has a significant part of the electronically functional components of the mobile telecommunication device attached thereto, providing a previously assembled display module which is a mechanical entity separate from said frame construction and comprises a window, a display panel and a bottom plate, providing a reader for detachable memory means which reader is a mechanical entity separate from said frame construction, providing a set of outer cover parts which are separate from said frame construction, providing a previously assembled keypad module which is a mechanical entity separate from said frame construction and assembling the mobile telecommunication device by inserting said reader for detachable memory means into said frame subassembly, attaching said printed circuit board to the frame subassembly, attaching said display module and said keypad module on top of said printed circuit board and attaching said outer cover parts to opposite sides of the aggregate comprising said frame subassembly reader for detachable memory means, display module and keypad module.

* * * * *

UNITED STATES PATENT AND TRADEMARK OFFICE
CERTIFICATE OF CORRECTION

PATENT NO. : 6,904,300 B1  
APPLICATION NO. : 09/503272  
DATED : June 7, 2005  
INVENTOR(S) : Maattanen et al.

Page 1 of 1

It is certified that error appears in the above-identified patent and that said Letters Patent is hereby corrected as shown below:

Column 11, line 53, claim 12, delete "defiens" and insert -- defines --.

Column 11, line 59, claim 13, delete "removable" and insert -- removably --.

Column 12, line 17, claim 17, after "into" insert -- at --.

Column 12, line 33, claim 21, delete "claim 21" and insert -- claim 20 --.

Column 12, line 59, claim 25, delete "wavelenghts" and insert -- wavelengths --.

Signed and Sealed this

Eleventh Day of July, 2006

JON W. DUDAS  
*Director of the United States Patent and Trademark Office*